(12) United States Patent
Jordan et al.

(10) Patent No.: US 12,554,036 B2
(45) Date of Patent: Feb. 17, 2026

(54) DEVICE AND METHOD FOR IMAGING UNDERGROUND FEATURES FROM A BOREHOLE

(71) Applicant: hyperTunnel IP Limited, Basingstoke (GB)

(72) Inventors: Steve Jordan, Basingstoke (GB); Fergus Flanagan, Basingstoke (GB); Eliott Turner, Basingstoke (GB)

(73) Assignee: hyperTunnel IP Limited, Basingstoke (GB)

(*) Notice: Subject to any disclaimer, the term of this patent is extended or adjusted under 35 U.S.C. 154(b) by 305 days.

(21) Appl. No.: 18/197,050

(22) Filed: May 13, 2023

(65) Prior Publication Data

US 2023/0280490 A1    Sep. 7, 2023

Related U.S. Application Data

(63) Continuation of application No. PCT/IB2021/060326, filed on Nov. 8, 2021.

(30) Foreign Application Priority Data

Nov. 13, 2020   (GB) ..................... 2017921

(51) Int. Cl.
*G01V 3/30* (2006.01)
*E21B 49/00* (2006.01)
*G01S 13/88* (2006.01)

(52) U.S. Cl.
CPC ........... *G01V 3/30* (2013.01); *E21B 49/00* (2013.01); *G01S 13/885* (2013.01)

(58) Field of Classification Search
None
See application file for complete search history.

(56) References Cited

U.S. PATENT DOCUMENTS 4,814,768 A * 3/1989 Chang .............. G01V 3/30
  324/333
2002/0185906 A1  12/2002 Stolarczyk
(Continued)

FOREIGN PATENT DOCUMENTS

| CN | 104635275 | 5/2015 |
| CN | 107436435 | 12/2017 |

(Continued)

OTHER PUBLICATIONS

UKIPO, Combined Search and Examination Report in corresponding UK application GB2017921.4, May 10, 2021.
(Continued)

*Primary Examiner* — Whitney Moore
(74) *Attorney, Agent, or Firm* — Alley IP

(57) ABSTRACT

Ground-penetrating radar antennas are generally intended for use in contact with the ground; however, antennas spaced from the ground (e.g. in air above ground) have also been developed. The present invention allows underground features to be imaged from a borehole so that underground assets and geological structures can be assessed (for example, to determine their integrity), and remedial works may be monitored. For example, structural reinforcement (e.g. chemical pumped into the geology for stability) can be checked to see where it has occurred and where it may not have yet reached.

5 Claims, 3 Drawing Sheets

(56) References Cited

U.S. PATENT DOCUMENTS

| | | |
|---|---|---|
| 2003/0052686 A1 | 3/2003 | Andreasen |
| 2003/0063014 A1 | 4/2003 | Stolarczyk |
| 2005/0001624 A1 | 1/2005 | Ritter et al. |
| 2008/0218400 A1 | 9/2008 | Stolarczyk et al. |
| 2010/0259438 A1* | 10/2010 | Jones ............... G01S 13/86 342/22 |
| 2018/0003848 A1* | 1/2018 | Schmidt ............. E21B 43/16 |
| 2019/0203583 A1 | 7/2019 | Øy |
| 2019/0242246 A1 | 8/2019 | Servin et al. |

FOREIGN PATENT DOCUMENTS

| | | |
|---|---|---|
| CN | 110333487 | 10/2019 |
| EP | 3605152 | 2/2020 |
| KR | 20130011090 | 1/2013 |

OTHER PUBLICATIONS

UKIPO, Examination Report in corresponding UK application GB2017921.4, Nov. 3, 2022.
WIPO, International Preliminary Report on Patentability in corresponding PCT Application PCT/IB2021/060326, Feb. 17, 2023.
CIPO, Office Action in corresponding CN Application 202180076950.0, Jul. 3, 2025.

* cited by examiner

DEVICE AND METHOD FOR IMAGING UNDERGROUND FEATURES FROM A BOREHOLE

RELATED APPLICATIONS

This application claims the benefit under 35 U.S.C. § 120, and is a continuation, of co-pending International Application PCT/IB2021/060326, filed Nov. 8, 2021 and designating the US, which claims priority to GB Application 2017921.4, filed Nov. 13, 2020, such GB Application also being claimed priority to under 35 U.S.C. § 119. These GB and International applications are incorporated by reference herein in their entireties.

FIELD

The present invention relates generally to a device and method for imaging underground features from a borehole and finds particular, although not exclusive, utility in remedial works.

BACKGROUND

Ground-penetrating radar (GPR) is a geophysical method that uses radar pulses to image geological features. Ground-penetrating radar antennas are generally intended for use in contact with the ground; however, antennas spaced from the ground (e.g. in air above ground) have also been developed.

SUMMARY

According to a first aspect of the invention, there is provided a device for imaging underground features from a borehole, the device comprising: at least one carriage configured to travel along a borehole in a longitudinal direction; a first ground-penetrating radar antenna on the carriage; a transmitter configured to control emission of radiation from the first antenna; a second ground-penetrating radar antenna on the at least one carriage; and a receiver configured to accept from the second antenna signals indicative of reception of radiation at the second antenna.

In this way, underground assets and geological structures can be assessed (for example, to determine their integrity), and remedial works may be monitored. For example, structural reinforcement (e.g. chemical pumped into the geology for stability) can be checked to see where it has occurred and where it may not have yet reached. This would avoid significant waste where an excess would otherwise be used to try and ensure the correct structural properties. Rather, the injection to be tailored to each location, in real time. The assessment of the geology prior to injection of chemical also allows a more efficient structural design that works with the existing geology.

In the simplest case, this may provide merely a one-dimensional assessment of geological structures along the borehole.

The first antenna and the second antenna may be a single transceiver antenna. The transceiver antenna may be configured to emit a beam of radiation having an opening angle of at most 180 degrees. The beam may be directed at right angles to the longitudinal direction. The at least one carriage may be configured to rotate the transceiver antenna about the longitudinal direction.

In this way, underground assets and geological structures can be mapped in three dimensions; that is, two dimensions by virtue of the rotation and opening angle, and one dimension by virtue of longitudinal movement along the borehole. In particular, the second antenna may receive reflected signals from the first antenna.

The at least one carriage may comprise a first carriage and a second carriage. The first antenna may be disposed on the first carriage and the second antenna may be disposed on the second carriage such that the first and second antennas are spaced apart from each other.

In this way, underground assets and geological structures can be mapped in two dimensions. For example, where the first and second carriages are in different boreholes, a two-dimensional sheet connecting the boreholes may be mapped. In particular, the second antenna may receive transmitted signals from the first antenna.

The first and second carriages may be moveable relative to each other such that a spacing between the first and second antennas can be varied.

In this way, underground assets and geological structures can be mapped in two dimensions. For example, where the first and second carriages are in the same borehole, and their spacing can be varied, the common midpoint approach (CMP) can be used to determine a distance along a borehole and a distance from the borehole of any features.

Each of the first and second carriages may be placed in a respective bore, or may be placed in the same bore.

The first and second antennas may be omnidirectional; that is, configured to emit a beam of radiation in all directions equally, or at least in all directions equally within a plane (such as a plane at right angles to the longitudinal direction). The opening angle of such a beam may be considered to be $4\pi$ sr (four pi steradians), or 360 degrees, respectively.

However, in alternative embodiments, the first and second antennas may each be configured to emit a beam of radiation having an opening angle of at most 180 degrees, the beam directed at right angles to the longitudinal direction.

In this way, underground assets and geological structures can be mapped in three dimensions; that is, two dimensions by virtue of the rotation and opening angle, and one dimension by virtue of longitudinal movement along the borehole(s).

Imaging may involve merely obtaining one or more radar-grams. However, in some circumstances, imaging may comprise reconstructing a three-dimensional model of underground features in the vicinity of the borehole.

The borehole may be any bore that is vertical, horizontal and/or any slope. The borehole may be formed by conventional means such as horizontal directional drilling (HDD). The borehole may have a diameter between 10 cm and 1 m, in particular between 20 cm and 60 cm, more particularly between 25 cm and 40 cm. Although most boreholes are expected to be circular in cross-section, other geometries are to be considered, and the word 'diameter' is to be construed accordingly, for example as a lateral extent of the cross-section, mean-lateral extent, etc.

The second carriage may comprise only one carriage, at least one second carriage or a plurality of second carriages, upon which may be disposed respective second antenna(s) for receiving radiation from the first antenna.

The first carriage may comprise only one carriage, at least one first carriage or a plurality of first carriages, upon which may be disposed respective first antenna(s) for transmitting radiation to the second antenna(s).

The carriage(s) may comprise a drive unit configured to provide motive force for driving the carriage along the borehole. Alternatively or additionally, the carriage(s) may be driven by a separate and distinct drive unit, and/or may be connected to up-bore drive equipment.

In this context 'down' a borehole may mean away from an opening of the borehole, 'up' may mean toward the opening of the borehole, and/or 'along' may mean 'up', 'down', or both. This terminology may not describe a direction with reference to gravity and/or the Earth's core.

The longitudinal direction may mean along a length of the borehole; that is, along an axis of the borehole.

The device may comprise a single ground-penetrating radar antenna or a plurality of such antennas. The ground-penetrating radar antenna(s) may comprise any antenna capable of emitting radiation having a frequency suitable for use in ground-penetrating radar applications, as is well understood in the art. In this regard higher frequencies are able to give higher resolution results compared to lower frequencies, but such higher frequency also tends to have lower penetration of solid material. The antenna(s) may be multi-spectral, or may be tuned to a specific frequency or band of frequencies. A plurality of antennas may be used, each tuned to a unique respective frequency for multi-spectral analysis of the underlying geology.

The antenna being on the carriage may mean merely being conveyed by the carriage, and is not limited to being mounted on a top surface of the carriage.

The beam of radiation may comprise a pulse. The beam of radiation may comprise a pencil beam, a cone beam (i.e. having a rotationally symmetric emission intensity about an emission axis), a fan beam (i.e. having emission limited to a single emission plane, but having reflectionally symmetric emission intensity about the emission axis), or any other configuration of beam geometry. In particular, the intensity within the beam may vary with angle from the emission axis. In the case of the fan beam, the emission plane may be arranged at right angles to the longitudinal direction; however, in preferred embodiments, the longitudinal direction lies within the emission plane.

The opening angle may be twice the angle from the emission axis to a zero-angle at which intensity is negligible compared to that along the emission axis. The opening angle may be at most 150 degrees, at most 120 degrees, at most 90 degrees, at most 60 degrees, at most 30 degrees, at most 10 degrees and/or at most 5 degrees. The opening angle may be at least 5 degrees, at least 10 degrees, at least 30 degrees, at least 60 degrees, at least 90 degrees, at least 120 degrees and/or at least 150 degrees.

The opening angle and/or beam geometry may be formed by locating radar absorbent material around the antenna. In this way, radiation emitted in directions away from a desired beam geometry and angle are absorbed (i.e. neither transmitted nor reflected). Any form of radar absorbent or attenuating material may be chosen.

Alternatively or additionally, the opening angle and/or beam geometry may be formed by shaping and/or configuring the antenna to emit a desired radiation pattern; that is, a desired directional (angular) dependence of the strength of the radio waves from the antenna.

In arrangements in which the second antenna is separate from the first antenna, the second antenna may be shielded and/or shaped/configured as above to only receive radiation within a restricted window (akin to the opening angle and/or beam geometry of the emitting antenna).

The device may further comprise a material bridging a distance between the antenna and a wall of the bore over the entire opening angle of the beam of radiation.

In this way, reflections from the interior of the borehole may be minimised. The material may comprise a solid, gel, foam and/or liquid; that is, the material may not be air.

Bridging may comprise bridging an entire distance to the wall of the bore (e.g. in all directions within the opening angle of the beam); however, in preferred embodiments this is unnecessary and bridging need only be used to the extent that radiation time-of-flight be equalised along different paths, as described below.

If the internal curvature of the borehole is high in relation to the size of the antenna, this curvature would give a significant reflection and reduces the penetration of the radar if not correctly managed. Adding a section of material with low attenuation, with matched dielectric constants and/or that is highly permeable (with respect to radar waves) to bridge the gap between the pipe and antenna solves this problem.

The material may comprise a plastics material. The material may comprise Polyethylene, PVC and/or ABS. The material may have a dielectric permittivity and/or dielectric constant approximately equal to Polyethylene, PVC and/or ABS. For example, if the borehole is lined with a pipe, the material may comprise the same material as the pipe. In this way, reflection at the pipe wall is minimised.

The material may be distributed such that any path in the beam from the antenna possesses a total time-of-flight equal to that in any other path in the beam.

In this way, any radiation that passes along a first path from the antenna that passes through a first distance before reaching the wall of the borehole is slowed by a first amount, and any radiation that passes along a second path from the antenna that passes through a second distance before reaching the wall of the borehole (different from the first distance) is slowed by a second amount, but the total second amount of slowing is the same as the total first amount of slowing, even though the first slowing per unit distance may be different from the second slowing per unit distance. Accordingly, errors and artifacts are reduced.

The beam directed at right angles to the longitudinal direction may mean the emission axis being at right angles to the longitudinal direction.

The control unit may be located on the carriage, near the carriage, or in an adjacent carriage. In particular, it is desirable for the control unit to be located within 15 m to maintain adequate signal to noise ratio, preferably less than 10 m. The control unit may comprise a signal generator that is in turn controlled remotely, for instance by a computer system or operator.

A single scan may produce a single one-dimensional radar-gram; that is, an indication of absorption/reflection in a single direction as a function of distance, recorded in the time domain, from the antenna.

Movement of the carriage along the borehole allows scan location to be varied in one dimension, thus multiple scans produce a single two-dimensional radar gram; that is, an indication of absorption/reflection in a two-dimensional slice in the direction of travel of the carriage.

Rotation of the antenna about the longitudinal direction permits scan direction to be varied at each given location, thus multiple scans produce a single three-dimensional radar gram (or multiple two-dimensional radar-grams); that is, an indication of absorption/reflection in a three-dimensional volume surrounding the borehole.

If the beam is not an infinitesimal pencil beam, an average result for absorption/reflection of the ground covered may be determined, as sampled by the Fresnel zone of the wavefront. Accordingly, as resolution is reduced by a larger beam angle, the number of scans at each antenna position can be reduced. In fact, in certain embodiments, the antenna may be continuously rotated as the carriage is moved along the borehole, for instance such that it maps our a helix of scans; however, the helix has a sufficiently low resolution that a complete picture of the three-dimensional volume surrounding the borehole is built up. However, in preferred embodiments, the beam would be selected as sufficiently narrow to improve resolution. In addition, the radiation pulse length and frequency would also be chosen for high resolution.

The device may further comprise a further first ground-penetrating radar antenna configured in a similar manner to the first antenna.

The further first antenna may be mounted on the same carriage or a different carriage (in which case, the different carriage may be coupled to the first carriage, and may be controlled by the same or a different control unit).

The further first antenna may be configured to emit radiation of the same and/or a different frequency/frequencies to the first antenna. This allows calculations of the mediums electromagnetic velocity to be made (via the use of velocity spectrum processing) and enhance the signal to noise of deeper objects using stacking principals.

The further antenna may be configured to rotate about the longitudinal direction in phase or out of phase with the first antenna. In this way, for example, a double helix path may be mapped out.

According to a second aspect of the present invention, there is provided a method of imaging underground features from a borehole, the method comprising the steps of: providing the device according to the first aspect; passing the at least one carriage along a borehole in a longitudinal direction; emitting a first beam of radiation from the first antenna; in response to emitting the first beam of radiation from the first antenna, receiving radiation at the second antenna.

The method may further comprise the step of: accepting from the antenna first signals indicative of reception of first radiation at the antenna.

The method may further comprise any one or more of the steps of: further rotating the antenna about the longitudinal direction; and emitting a second beam of radiation from the antenna and accepting from the antenna second signals indicative of reception of second radiation at the antenna.

The method may further comprise any one or more of the steps of: providing a second device according to the first aspect; passing the carriage of the second device along a second borehole in a second longitudinal direction; rotating the antenna of the second device about the second longitudinal direction; and accepting from the antenna first signals indicative of reception of first radiation at the antenna.

In this way, tomographic surveys may be conducted in which a transmitter and a receiver are in different bores.

The method may further comprise the step of lining a borehole with a pipe and/or liner. The pipe and/or liner may comprise a plastics material such as Polyethylene, PVC and/or ABS.

According to a third aspect of the present invention, there is provided a system comprising the device of the first aspect, and a borehole. The borehole may be lined with a pipe and/or liner.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
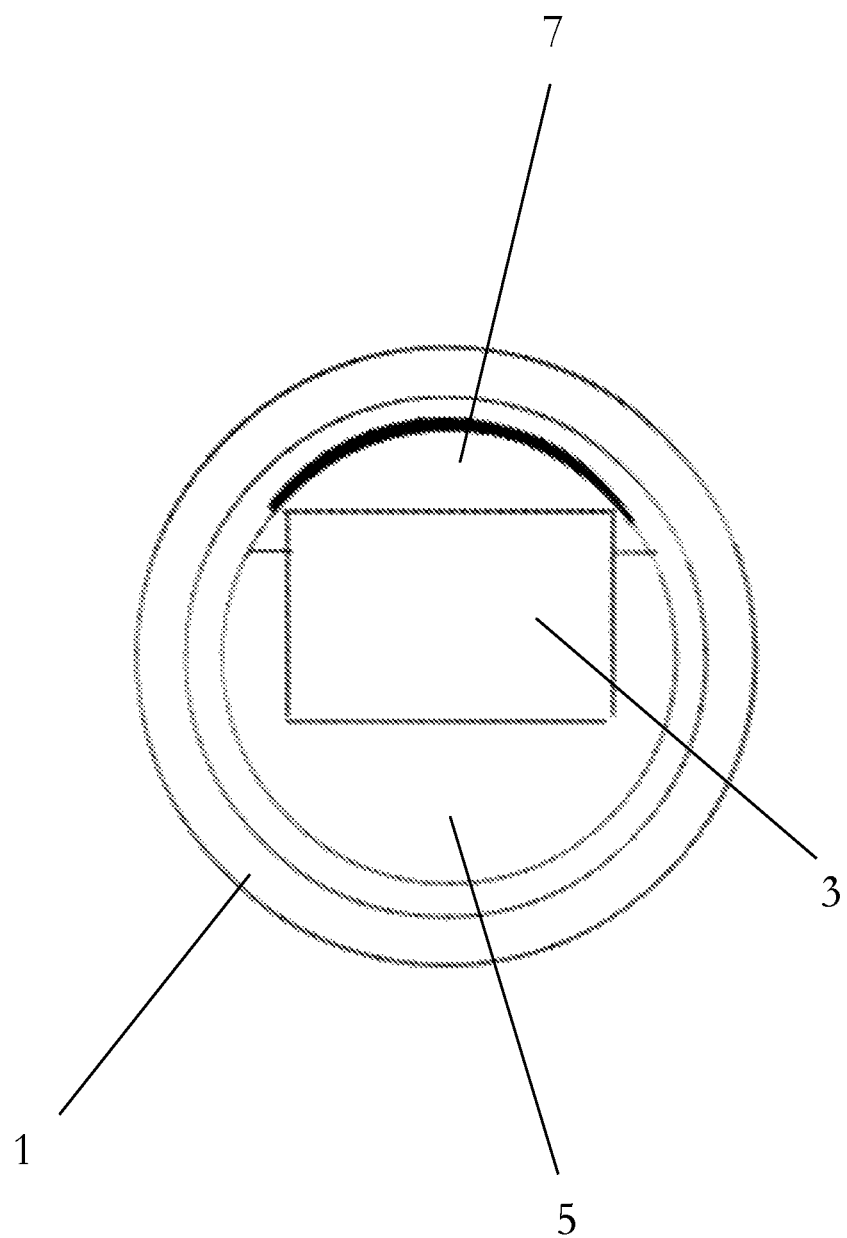
FIG. 1 is a cross-sectional view of a carriage in a pipe.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a cross-sectional view of a carriage in a pipe 1. The carriage is shown within the pipe 1, and has an antenna 3 located in its interior. Radar-opaque material 5 is disposed substantially around three sides of the antenna such that a radiation beam from the antenna is confined to a 180-degree region above the antenna 3 as shown in the figure.

The remaining side of the antenna 3 is surrounded by radar-conductive material 7 such that the distance between the antenna 3 and the pipe 1 is substantially bridged by the radar-conductive bridging material 7.

Figure 2:
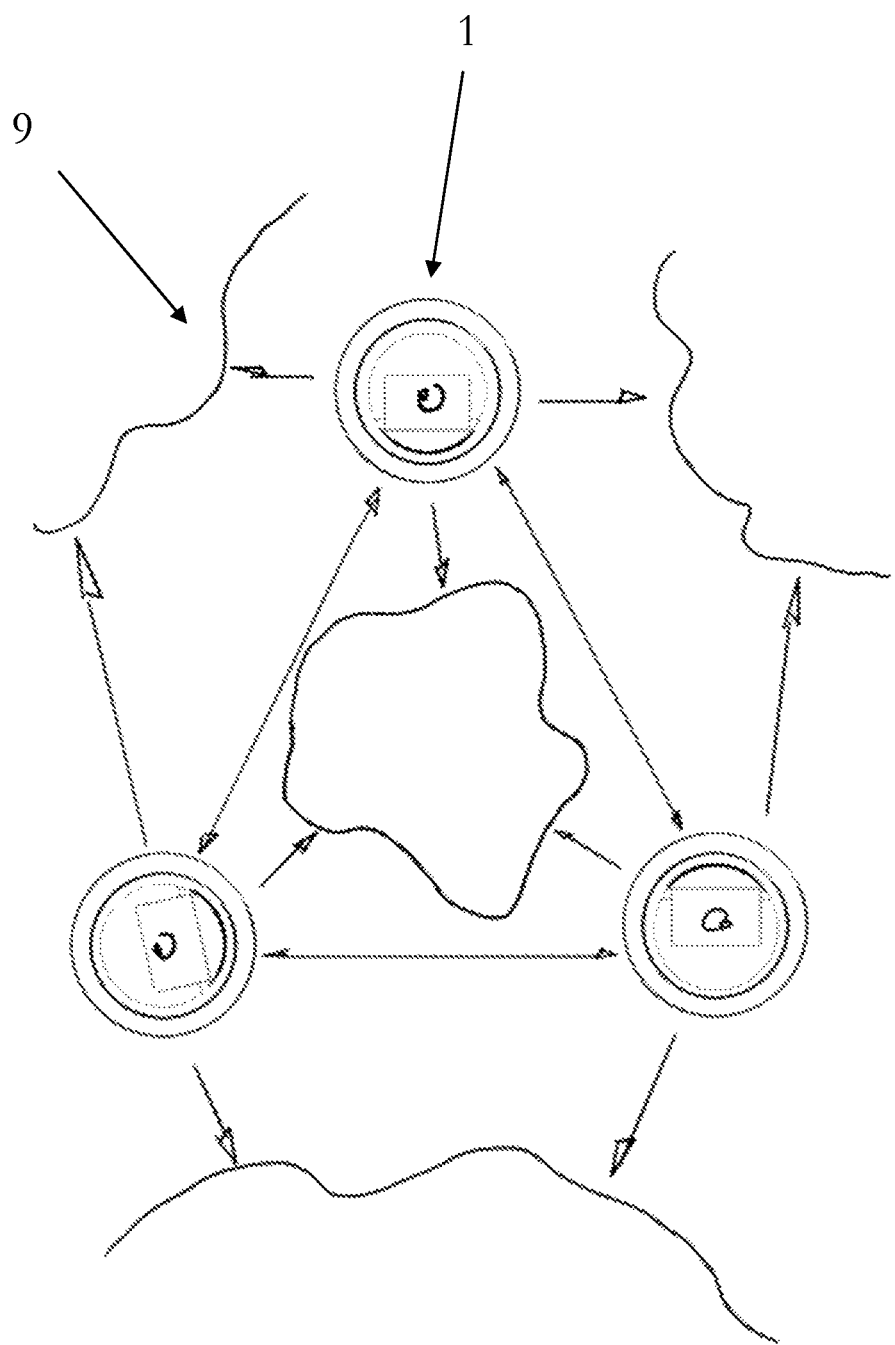
FIG. 2 is a cross-sectional view of three pipes with respective carriages therein.

FIG. 2 is a cross-sectional view of three pipes 1 like those in FIG. 1, with respective carriages therein. The antennas are rotatable as indicated by the curved arrows inside the pipes. The antennas have been rotated in different rotational directions; however, indicated in the figure by the straight arrows are the directions at which each antenna has been rotated to acquire data.

The single headed arrows show directions in which conventional radar approaches have been taken to acquire the data; that is, each antenna acting as its own transmitter and receiver.

The double headed arrows show acquisition of data where one of the antennas acts as a receiver of radiation from another antenna (acting as transmitter).

In this way, the three radar units locate the same objects 9, using each other to corroborate and/or triangulate their own positions.

Figure 3:
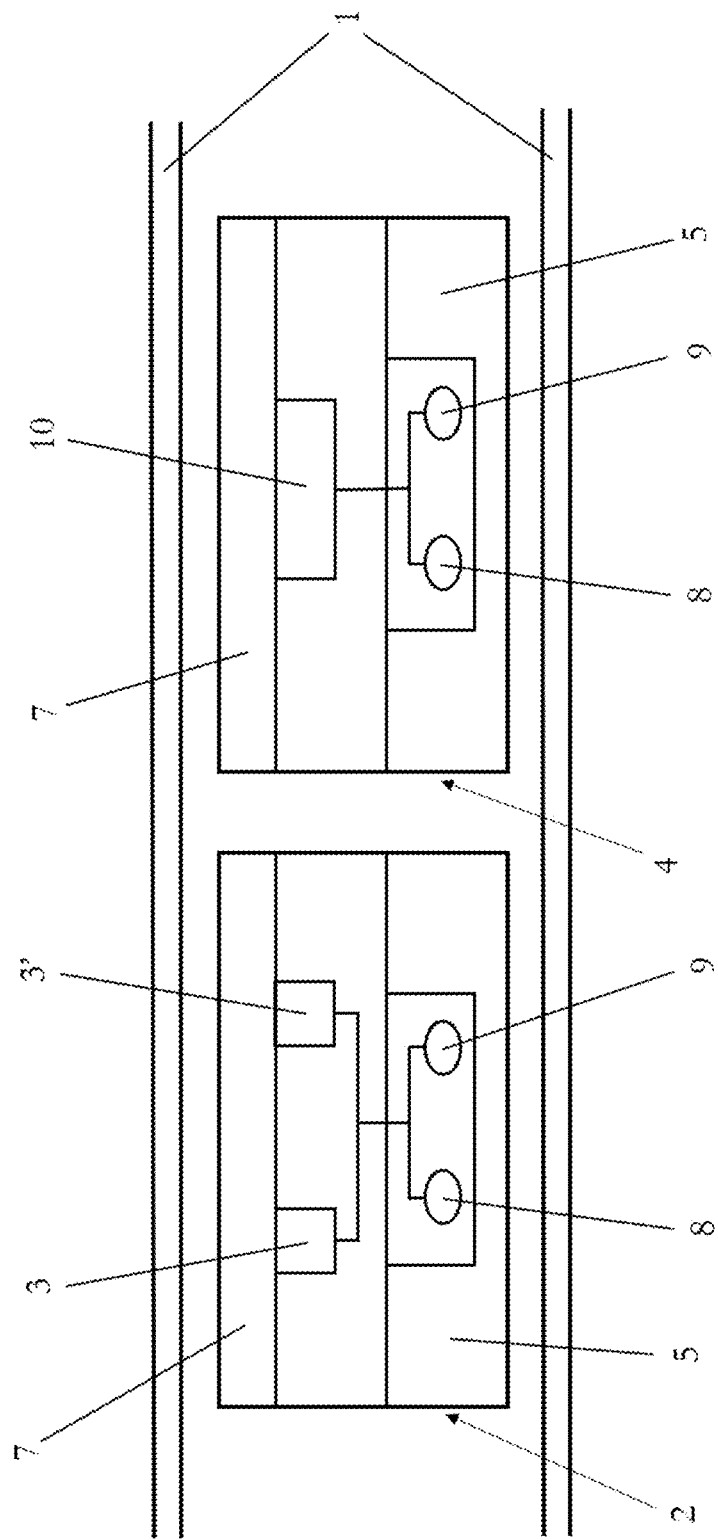
FIG. 3 is a cross-sectional view of a first carriage and a second carriage in a pipe along the longitudinal axis of the pipe.

FIG. 3 is a cross-section view of a pipe 1 along its longitudinal axis, with a first carriage 2 and a second carriage 4 therein. Two first ground-penetrating radar antennas 3 and 3' are disposed within a first carriage 2, and one second ground-penetrating radar antenna 10 is disposed on a second carriage 4.

The first ground-penetrating antennas and the second ground-penetrating antenna are connected to the transmitter 8 and receiver 9 disposed within their respective carriages.

Radar-opaque material 5 and radar-conductive bridging material 7 in the first and second carriages substantially surround the first and second ground-penetrating radar antennas respectively.

The invention claimed is:

1. A device for imaging underground features from a borehole, the device comprising:
    first carriage configured to travel along the borehole in a longitudinal direction;
    a first ground-penetrating radar antenna;
    a transmitter configured to control emission of radiation from the first ground-penetrating radar antenna;
    a second ground-penetrating radar antenna;
    a receiver configured to accept from the second ground-penetrating radar antenna signals indicative of reception of radiation at the second ground-penetrating radar antenna; and
    a second carriage, wherein,
        the first ground-penetrating radar antenna is disposed on the first carriage and the second ground-penetrating radar antenna is disposed on the second carriage such that the first and second ground-penetrating radar antennas are spaced apart from each other, and
        the first and second carriages are moveable relative to each other in a longitudinal direction along the borehole such that a spacing between the first and the second ground-penetrating radar antennas can be varied.

2. The device according to claim 1, further comprising a material bridging a distance between the first ground-penetrating radar antenna and/or the second ground-penetrating radar antenna and a wall of the borehole over the entire beam of radiation.

3. The device according to claim 2, wherein the material may be distributed such that any path in the beam from the first ground-penetrating radar antenna and/or the second ground-penetrating radar antenna possesses a total radar time of flight equal to that in any other path in the beam.

4. The device according to claim 1, further comprising:
   a third ground-penetrating radar antenna disposed on the first carriage.

5. A method of imaging underground features from a borehole, the method comprising the steps of:
   providing the device according to claim 1;
   passing at least the first carriage along the borehole in a longitudinal direction;
   emitting a first beam of radiation from the first ground-penetrating radar antenna; and
   in response to emitting the first beam of radiation from the first ground-penetrating radar antenna, receiving radiation at the second ground-penetrating radar antenna.

* * * * *